(12) United States Patent
Bijl et al.

(10) Patent No.: US 11,146,297 B2
(45) Date of Patent: Oct. 12, 2021

(54) STREET LIGHTING POLE BASE

(71) Applicant: SIGNIFY HOLDING B.V., Eindhoven (NL)

(72) Inventors: Petra Bijl, Eindhoven (NL); Koos Van Oorschot, Eindhoven (NL); Alouisius Johannes Gerardus Maria Willemse, Eindhoven (NL); Ay Ling De Goederen-Oei, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/972,842

(22) PCT Filed: Jun. 17, 2019

(86) PCT No.: PCT/EP2019/065843
§ 371 (c)(1),
(2) Date: Dec. 7, 2020

(87) PCT Pub. No.: WO2020/002020
PCT Pub. Date: Jan. 2, 2020

(65) Prior Publication Data
US 2021/0250053 A1 Aug. 12, 2021

(30) Foreign Application Priority Data
Jun. 28, 2018 (EP) .................................. 18180419

(51) Int. Cl.
*H04B 1/036* (2006.01)
(52) U.S. Cl.
CPC .................................... *H04B 1/036* (2013.01)

(58) Field of Classification Search
CPC .......... H04B 1/036; F21S 8/085; F21S 8/088; E04H 5/12
See application file for complete search history.

(56) References Cited

U.S. PATENT DOCUMENTS

| | | | |
|---|---|---|---|
| 6,400,567 B1 | 6/2002 | McKeen et al. | |
| 6,504,714 B1 | 1/2003 | Richter | |
| 2017/0030571 A1 | 2/2017 | Kawahara | |
| 2019/0273313 A1* | 9/2019 | Schwartz | H01Q 1/246 |
| 2020/0182451 A1* | 6/2020 | Girouard | F21V 29/60 |

FOREIGN PATENT DOCUMENTS

| | | |
|---|---|---|
| CN | 206674404 U | 11/2017 |
| WO | 2018114495 A1 | 6/2018 |
| WO | 2018153261 A1 | 8/2018 |

* cited by examiner

*Primary Examiner* — Nguyen T Vo

(57) ABSTRACT

The present invention relates to a street lighting pole base (10), i.a. comprising a sub-divider (38) arranged in a first bay (20a) and adapted to split an airflow (46) from an individual air inlet (28) into a first sub-airflow (48a) intended to mainly cool a first heat dissipating device used for wireless telecommunication (34a) when mounted in a first position (36a) but substantially not a second heat dissipating device used for wireless telecommunication (34b) when mounted in a second position (36b) and a second sub-airflow (48b) intended to mainly cool the second heat dissipating device used for wireless telecommunication but substantially not the first heat dissipating device used for wireless telecommunication. The present invention also relates to a street lighting pole (100) comprising such a base, and to a method of cooling first and second heat dissipating device used for wireless telecommunications mounted in such a base or pole.

15 Claims, 16 Drawing Sheets

STREET LIGHTING POLE BASE

CROSS-REFERENCE TO PRIOR APPLICATIONS

This application is the U.S. National Phase application under 35 U.S.C. § 371 of International Application No. PCT/EP2019/065843, filed on Jun. 17, 2019, which claims the benefit of European Patent Application No. 18180419.6, filed on Jun. 28, 2018. These applications are hereby incorporated by reference herein.

FIELD OF THE INVENTION

The present invention relates to a street lighting pole base. The present invention also relates to a street lighting pole comprising such a base. The present invention also relates to a method of cooling first and second heat dissipating devices used for wireless telecommunication mounted in such a base or pole.

BACKGROUND OF THE INVENTION

Recently street lighting poles that have been modified to include telecommunication equipment (radios, antennas, cables), such that the street lighting pole also gets a wireless telecommunications functionality. The equipment is integrated within the outer surface of the light pole with the purpose of obscuring it from public view. This may be referred to as telecom smart pole.

However, since the need for mobile data transmission is growing very rapidly and the capacity of a single telecommunication radio and antenna is limited, there is the need to add more radios that communicate over different parts of the radio spectrum. As a result, there is a need to also include more radios in the smart pole base, which has the result that there is an increased thermal load on the enclosure of the base.

Because there are severe constraints for the outer diameter of the smart pole to obtain city acceptance in the right of way, the only possibility is to position the radios vertically with respect to each other, but this has the disadvantage that the most upper radios have a higher probability of overheating or thermal failure, since they are cooled with heated air from the lowed radios. A general remedy to ease the thermal problem is to put the device with the highest heat load at the upper position. Even though this is an improvement, the problem of the lower radio heating the top radios has not been solved.

U.S. Pat. No. 6,400,567B1 discloses an equipment enclosure having separate compartments cooled by separate cooling airflows.

SUMMARY OF THE INVENTION

It is an object of the present invention to overcome the aforementioned problems, and to provide an improved street lighting pole base.

According to a first aspect of the invention, this and other objects are achieved by a street lighting pole base, comprising: at least one upright outer wall defining an enclosed space of the street lighting pole base; a divider dividing the enclosed space into at least two bays arranged side by side, the at least two bays including a first bay and a second bay; an individual air inlet for the first bay provided at the bottom of the divider; first mounting means for mounting a first heat dissipating device used for wireless telecommunication in a first position in the first bay; second mounting means for mounting a second heat dissipating device used for wireless telecommunication in a second position in the first bay, which second position is vertically higher than the first position; and a sub-divider arranged in the first bay and adapted to split an airflow from the individual air inlet for the first bay into a first sub-airflow into a first sub-bay and intended to (mainly) cool the first heat dissipating device used for wireless telecommunication when mounted in the first position in the first sub-bay but (substantially) not the second heat dissipating device used for wireless telecommunication when mounted in the second position and a second sub-airflow into a second sub-bay and intended to (mainly) cool the second heat dissipating device used for wireless telecommunication when mounted in the second position in the second sub-bay but (substantially) not the first heat dissipating device used for wireless telecommunication when mounted in the first position.

The at least one upright outer wall could be a cylindrical or tubular wall, or several walls forming a box, for example. The first and second mounting means could be hole patterns and/or brackets, for example. The first and second heat dissipating devices used for wireless telecommunication may for example be first and second telecommunication radios or first and second base stations. The first and second heat dissipating devices may be mounted in the first and second positions, respectively, and hence be regarded as being included in the street lighting pole base. 'Mainly cool' can mean and preferably does mean that at least 80% (preferably at least 90%) of the sub-airflow in question is available to cool the heat dissipating device in question. 'Substantially not' can mean and preferably does mean that no more than 20% (preferably no more than 10%) of the sub-airflow in question is available to cool the other heat dissipating device.

The present invention is based on the understanding that by providing the aforementioned individual air inlet and sub-divider, more than one heat dissipating device used for wireless telecommunication can be arranged on either side of the (main) divider while still providing sufficient cooling without making the street lighting pole base excessively wide, as the sub-divider may prevent the top heat dissipating device from being "cooled" with heated air from the bottom heat dissipating device. Namely, the entry temperature of the air for the first heat dissipating device and the second heat dissipating device may essentially be the same, meaning that both heat dissipating devices may be cooled with the same capacity. The present street lighting pole base may also have a similar individual air inlet and sub-divider for the second bay, whereby at least four heat dissipating devices used for wireless telecommunication may be provided in the street lighting pole base.

The sub-divider may divide at least part of the first bay into a first sub-bay for the first sub-airflow and a second sub-bay for the second sub-airflow, wherein the first and second sub-bays are arranged side by side. The first and second sub-airflows may be separate. The first and second sub-airflows may be considered separate and provide efficient individual cooling of the first and second heat dissipating devices when no more than 20% of the sub-airflow of one sub-bay can enter the other sub-bay. Preferably, no more than 10% of the sub-airflow of e.g. the first sub-bay can enter the second sub-bay, and vice versa.

The sub-divider may include a (substantially) vertical inner wall, wherein the first and second sub-airflows in operation flow on opposite sides of the substantially vertical inner wall. That is, the aforementioned first and second sub-bays may be on opposite sides of the substantially vertical inner wall.

The divider may be H-shaped and formed by stems connected by a cross-bar, wherein the sub-divider may extend between and connect the stems of the H-shaped divider.

In one embodiment, the first heat dissipating device used for wireless telecommunication when mounted in the first position is arranged in the first sub-bay, wherein the second heat dissipating device used for wireless telecommunication when mounted in the second position is arranged in the second sub-bay. In this embodiment, the first and second heat dissipating devices may be completely separated so that the first heat dissipating device is only exposed to the first sub-airflow and so that the second heat dissipating device is only exposed to the second sub-airflow, which in turn provides for improved cooling.

In another embodiment, the first heat dissipating device used for wireless telecommunication when mounted in the first position is arranged in the first sub-bay, wherein the second heat dissipating device used for wireless telecommunication when mounted in the second position is arranged on top of the sub-divider and has its cooling means placed above the second sub-bay. The cooling means may for example be cooling fins provided on a side of the second heat dissipating device. In this embodiment, the first and second heat dissipating devices may be mounted with little or no lateral separation while still providing sufficient cooling, which provides for a narrower "smart" street lighting pole base.

In yet another embodiment, the first heat dissipating device used for wireless telecommunication is mounted in the first position and the second heat dissipating device used for wireless telecommunication is mounted in the second position, wherein the second heat dissipating device used for wireless telecommunication is arranged on top of the first heat dissipating device used for wireless telecommunication, wherein the first heat dissipating device used for wireless telecommunication has its cooling means facing the first sub-bay, wherein the second heat dissipating device used for wireless telecommunication has its cooling means facing the second sub-bay, and wherein the first and second heat dissipating device used for wireless telecommunication form part of said sub-divider. Hence, the cooling means of the first and second heat dissipating devices may here face opposite directions. In this embodiment, sufficient cooling may be achieved even though the second heat dissipating device is arranged on top of the first heat dissipating device (no lateral separation), wherein the latter provides for a narrow "smart" street lighting pole base.

In a further embodiment, the first heat dissipating device used for wireless telecommunication is mounted in the first position, wherein the first heat dissipating device used for wireless telecommunication forms a lower part of said sub-divider, and wherein said sub-divider further comprises an upper part adapted to guide the first sub-airflow past the second position for the second heat dissipating device used for wireless telecommunication. In this way, the upper part of the sub-divider may help capturing hot air from the first heat dissipating device and guide it past the second heat dissipating device.

The second sub-bay may comprise a duct formed at least partly by the sub-divider, which duct is adapted to guide the second sub-airflow past the first position for the first heat dissipating device used for wireless telecommunication to the second position for the second heat dissipating device used for wireless telecommunication. Hence, the sub-divider may help to explicitly guide the second sub-airflow past the first heat dissipating device, so that the second sub-airflow is not (substantially) heated by the first lower heat dissipating device and instead efficiently can cool the second upper heat dissipating device.

The duct may have a narrower cross-section in level with the first position for the first heat dissipating device used for wireless telecommunication and a wider cross-section towards at least one of the individual air inlet for the first bay and an individual air outlet for the first bay. This allows a better air inlet and/or outlet while allowing the second sub-airflow to pass next two the first lower heat dissipating device in a relatively narrow portion of the duct. The latter means that the overall width or diameter of the street lighting pole base can be kept small.

The street lighting pole base may further comprise at least one movable part adapted to regulate at least one of the first and second sub-airflows. The at least one movable part can for example be at least one valve. By means of the at least one movable part, more air could for example be directed to the first heat dissipating device if it is overheating because of more intensive use. The at least one movable part can for example be controlled by one or more thermostats, which may be integrated with the first and second heat dissipating devices.

The street lighting pole base may further comprise a common air outlet for the least two bays provided at the top of the street lighting pole base. The common air outlet at the top of the base may allow sufficient air heated by the heat dissipating devices in the base to be exhausted. In practice, more heat dissipating devices used for wireless telecommunication mean more RF cables going up to high-mounted antennas. These cables might block airflow to a higher air exhaust, like the "second vent opening 31" in WO2018114495A1. Furthermore, the street lighting pole base may comprise an (additional) air outlet for the first sub-flow, which air outlet is in the at least one upright outer wall below the position for the second heat dissipating device used for wireless telecommunication. This may (further) prevent the first sub-flow warmed up by the first lower heat dissipating device in operation from reaching the second upper heat dissipating device.

The street lighting pole base may further comprise an additional air inlet provided in the at least one upright outer wall above the individual air inlet and adapted to provide additional air to the second position for the second heat dissipating device used for wireless telecommunication. This may enhance cooling of the second upper heat dissipating device.

According to a second aspect of the invention, there is provided a street lighting pole, comprising: a street lighting pole base according to the first aspect; a mid-pole mechanically connected to the street lighting pole base; an antenna electrically connectable or connected to the first and second heat dissipating devices used for wireless telecommunication; and a luminaire adapted to emit light. This aspect may exhibit the same or similar features and technical effects as the first aspect, and vice versa.

According to a third aspect of the invention, there is provided a method of cooling first and second heat dissipating devices used for wireless telecommunication mounted in a street lighting pole base according to the first aspect or in a street lighting pole according to the second aspect, the method comprising: splitting by means of the sub-divider an airflow from the individual air inlet for the first bay into a first sub-airflow into a first sub-bay mainly cooling the first heat dissipating device mounted in the first sub-bay and used for wireless telecommunication but substantially not the second heat dissipating device used for wireless telecommunication and a second sub-airflow into a second sub-bay mainly cooling the second heat dissipating device mounted in the second sub-bay and used for wireless telecommunication but substantially not the first heat dissipating device used for wireless telecommunication. This aspect may exhibit the same or similar features and technical effects as the first and/or second aspect, and vice versa.

It is noted that the invention relates to all possible combinations of features recited in the claims.

BRIEF DESCRIPTION OF THE DRAWINGS

There and other aspects of the present invention will now be described in more detail, with reference to the appended drawings showing embodiment(s) of the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

Figure 1A:
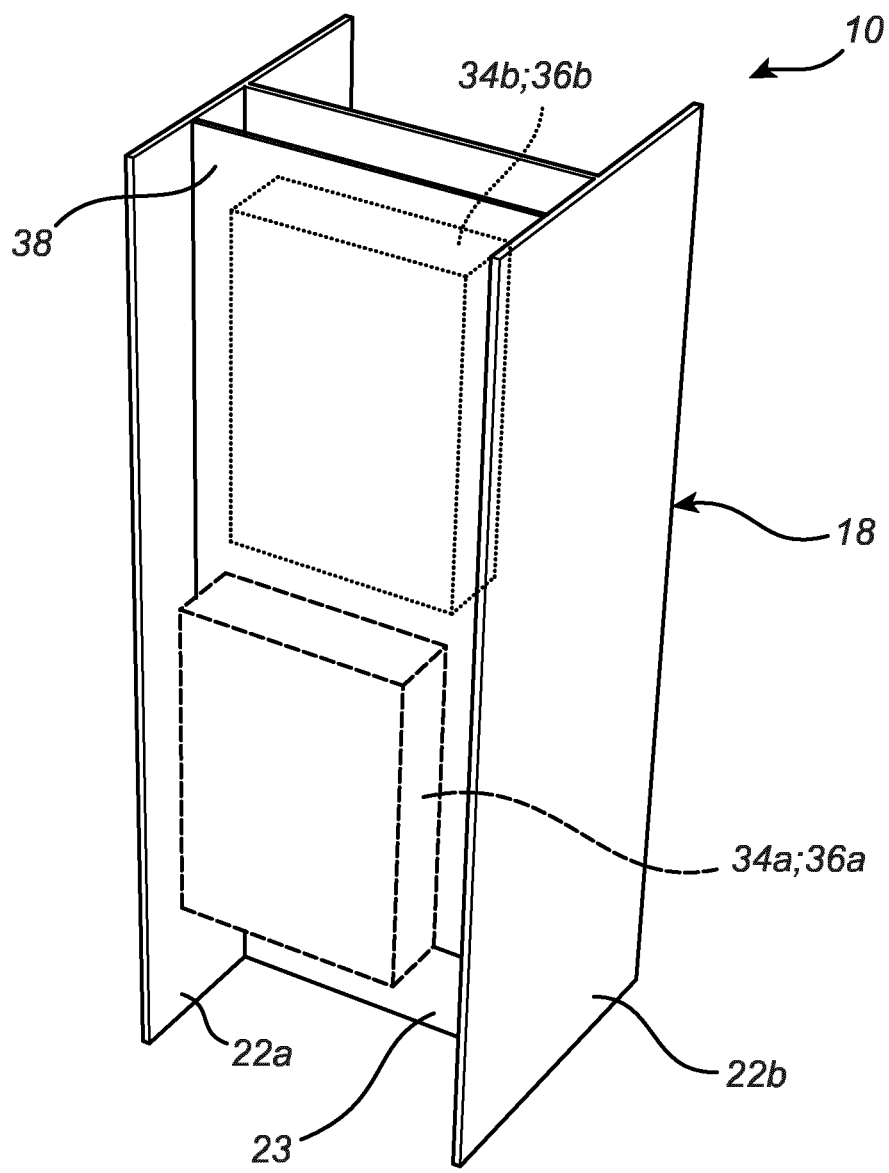
FIGS. 1a-c schematically show a street lighting pole base according to an embodiment of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. The present invention will typically be described with reference to its usual orientation as shown in the drawings.

Figure 1B:
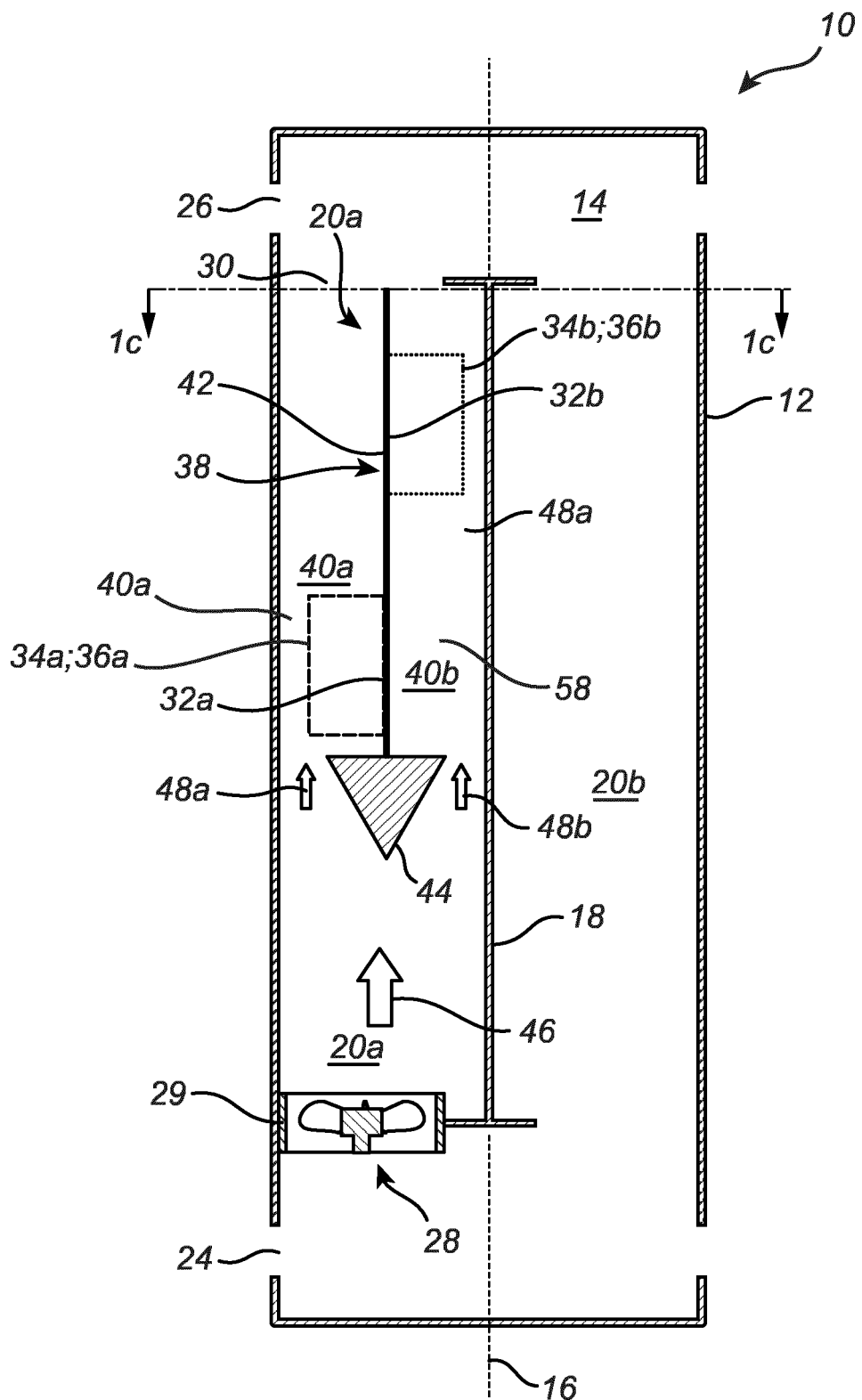
Figure 1C:
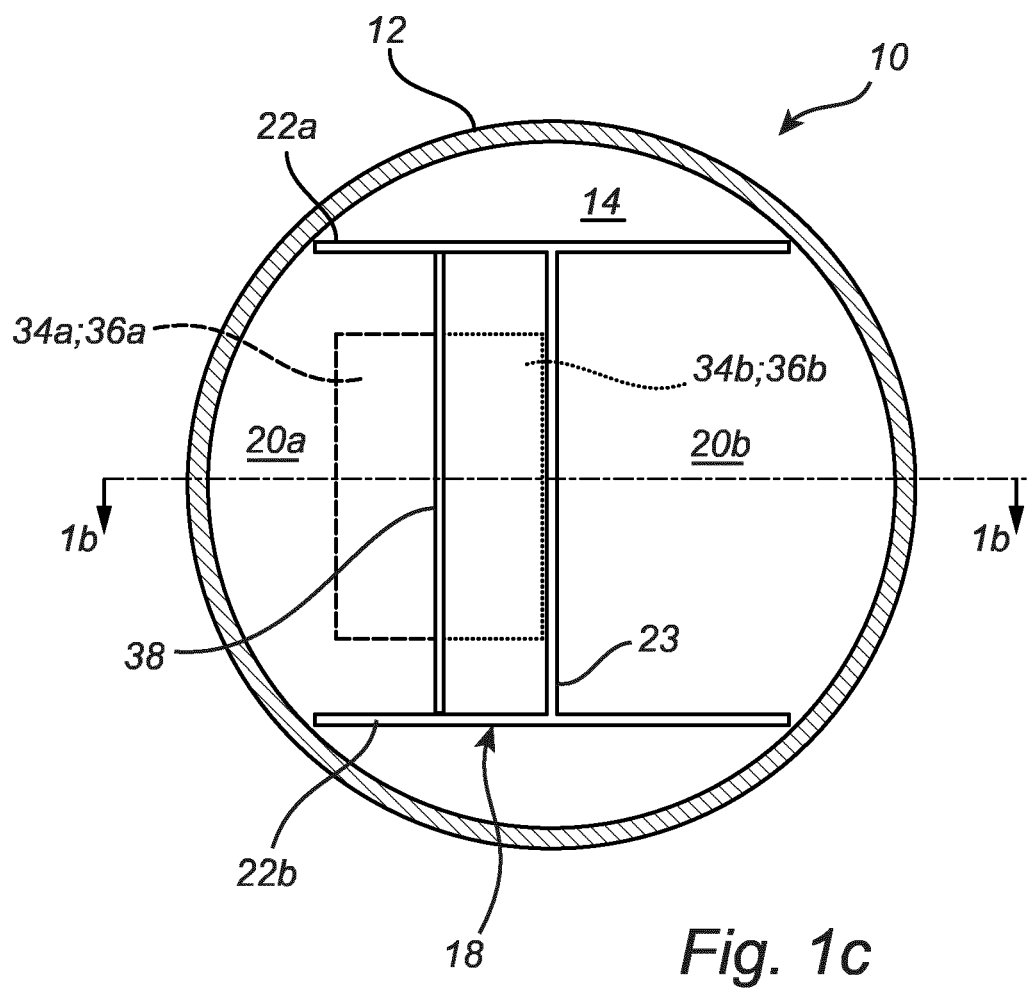

FIGS. 1a-c schematically show a street lighting pole base 10 according to an embodiment of the present invention. FIG. 1a is a perspective view, FIG. 1b is a cross-sectional side view, and FIG. 1c is a cross-sectional top view.

The street lighting pole base 10 comprises at least one upright outer wall 12 defining an enclosed space 14. The at least one upright outer wall is here a cylindrical or tubular wall 12. The cylindrical or tubular wall 12 extends in an axial direction along a length axis 16 of the street lighting pole base 10. The cylindrical or tubular wall 12 may be a right circular open cylinder. In FIG. 1a, the cylindrical or tubular wall 12 is not shown for brevity.

The street lighting pole base 10 further comprises a divider 18 dividing the enclosed space 14 into two bays, namely a first bay 20a and a second bay 20b, arranged side by side. The divider 18 extends in the axial direction, and may be substantially vertically arranged. The divider 18 is preferably H-shaped and formed by stems 22a-b connected by a cross-bar 23. Ends of the stems 22a-b touches the cylindrical or tubular wall 12 circumscribing the divider 18, thereby essentially dividing the enclosed space 14 into the two bays 20a-b. The divider 18 preferably blocks air from passing from the first bay 20a to the second bay 20b, and vice versa.

The cylindrical or tubular wall 12 may comprise two doors (see FIG. 7), one for each of the first and second bays 20a-b.

The divider 18 here extends in the axial direction along a portion of the length of the street lighting pole base 10. Below the divider 18, at the bottom of the street lighting pole base 10, the street lighting pole base 10 may comprise a common air inlet 24 for the two bays 20a-b. That is, the common air inlet 24 may supply (cooling) air from the outside of the street lighting pole base 10 to both the bays 20a-b. As further seen in FIG. 7, the common air inlet 24 comprises an opening in the cylindrical or tubular wall 12, which opening extend along at least a portion of the circumference of the cylindrical or tubular wall 12. The opening of the common air inlet 24 may for example be ring-shaped. The opening of the common air inlet 24 may be equipped with a meshed structure, to prevent insects and birds from entering, but at the same time allow enough air to pass. Above the divider 18, at the top of the street lighting pole base 10, the street lighting pole base 10 may comprise a common air outlet 26 for the two bays 20a-b. That is, the common outlet inlet 26 may allow (heated cooling) air from both bays 20a-b to escape to the outside of the street lighting pole base 10. As further seen in FIG. 7, the common air outlet 26 comprises an opening in the cylindrical or tubular wall 12, which opening extend along at least a portion of the circumference of the cylindrical or tubular wall 12. The opening of the common air outlet 26 may for example be ring-shaped. The opening of the common air outlet 26 may be equipped with a meshed structure, to prevent insects and birds from entering, but at the same time allow enough air to pass.

The street lighting pole base 10 further comprises an individual air inlet 28 for the first bay 20a, which individual air inlet 28 is provided at the bottom of the divider 18. The individual air inlet 28 is formed by the cylindrical or tubular wall 12 and the divider 18. The individual air inlet 28 is in fluid communication with the common air inlet 24, and allows (cooling) air from the common air inlet 24 to be exclusively supplied to the first bay 20a. At least one fan 29 may be arranged in the individual air inlet 28, to force air into the first bay 20a.

The street lighting pole base 10 may further comprise an individual air outlet 30 for the first bay 20a, which individual air outlet 30 is formed by the cylindrical or tubular wall 12 and the divider 18 and provided at the top of the divider 18. The individual air outlet 30 is in fluid communication with the common air outlet 26. The street lighting pole base 10 may further comprise a corresponding individual air inlet and individual air outlet for the second bay 20b.

The street lighting pole base 10 further comprises first mounting means 32a for mounting a first heat dissipating device used for wireless telecommunication, here a first telecommunication radio 34a, in a first position 36a in the first bay 20a. The street lighting pole base 10 further comprises second mounting means 32b for mounting a second heat dissipating device used for wireless telecommunication, here a second telecommunication radio 34b, in a second position 36b in the first bay 20a. The second position 36b is vertically higher than the first position 36a, so that the second telecommunication radio 34b may be mounted higher than the first telecommunication radio 34a. In other words, the first and second telecommunication radios 34a-b may have different positions in the aforementioned axial direction. The first and second mounting means 32a-b could be hole patterns and/or brackets, for example. The first and second telecommunication radios 34a-b generally generates and receives radio frequency signals. The first and second telecommunication radios 34a-b could be radio 2203, 2205, or 2208 from Ericsson, for example. In case the first and second telecommunication radios 34a-b have different thermal loads, the one with the highest thermal load is preferably mounted vertically higher than the other. Also, the overall velocity of the aforementioned at least one fan 29 may vary depending on the operating temperature of the first and second telecommunication radios 34a-b and/or the temperature outside the street lighting pole base 10. Furthermore, the first and second telecommunication radios 34a-b when mounted in the street lighting pole base 10 may be concealed in the street lighting pole base 10 by the cylindrical or tubular wall 12.

The street lighting pole base 10 further comprises a sub-divider 38 arranged in the first bay 20a, which first bay 20a effectively is a chimney for cooling. The sub-divider 38 may for example be made of steel, aluminum or a plastic. The sub-divider 38 divides at least part of the first bay 20a into first and second sub-bays 40a-b arranged side by side. The sub-divider 38 preferably extends between and connects the stems 22a-b of the divider 18, and may be (generally) parallel to the cross-bar 23 of the divider 18. The sub-divider 38 may include a (substantially) vertical inner wall 42. The lower end of the sub-divider 38 may include a triangular prism-shaped element 44. The second sub-bay 40b may comprise a duct, here formed by the sub-divider 38 together with the divider 18. Alternatively, the duct could be formed by the sub-divider 38 together with a separate part (not shown). The vertical inner wall 42 and the triangular prism-shaped element 44 of the sub-divider 38 may be so arranged that the duct has a narrower cross-section in level with (the first position 36a for) the first telecommunication radio 34a and a wider cross-section towards the individual air inlet 28, as illustrated e.g. in FIG. 1b.

In FIGS. 1a-c, the first telecommunication radio 34a (when mounted in the first position 36a) is arranged in the first sub-bay 40a, and the second telecommunication radio 34b (when mounted in the second position 36b) is arranged in the second sub-bay 40b. Namely, the first and second telecommunication radios 34a-b are arranged on opposite sides of the aforementioned vertical inner wall 42 of the sub-divider 38.

The sub-divider 38 is generally adapted to split an airflow 46 from the individual air inlet 28 into a first sub-airflow 48a intended to mainly cool the first telecommunication radio 34a when mounted in the first position 36a but substantially not the second telecommunication radio 34b when mounted in the second position 36b and a second sub-airflow 48b intended to mainly cool the second telecommunication radio 34b when mounted in the second position 36b but substantially not the first telecommunication radio 34a when mounted in the first position 36a.

In operation (FIGS. 1a-c), air comes from the outside of the street lighting pole base 10 first through the common air inlet 24 and then through the individual air inlet 28 into the first bay 20a forming the (upwards) airflow 46. The air flow 46 is split by means of the sub-divider 38 into the first and second sub-airflows 48a-b. The first sub-airflow 48a flows upwards in the first sub-bay 40a on one side of the vertical inner wall 42 of the sub-divider 38 and cools the first telecommunication radio 34a in the first sub-bay 40a, whereafter it escapes the street lighting pole base 10 via the individual air outlet 30 and the common air outlet 26. The sub-divider 38 helps capturing hot air from the first telecommunication radio 34a and guides it past the second telecommunication radio 34b. The second sub-airflow 48b flows upwards in the second sub-bay 40b on the opposite side of the vertical inner wall 42 of the sub-divider 38 and is guided past the first telecommunication radio 34a by the aforementioned duct before cooling the second telecommunication radio 34b in the second sub-bay 40b, whereafter it escapes the street lighting pole base 10 via the individual air outlet 30 and the common air outlet 26.

It is appreciated that the second bay 20b may contain a corresponding configuration as the first bay 20a, or some other configuration as disclosed herein.

Figure 2A:
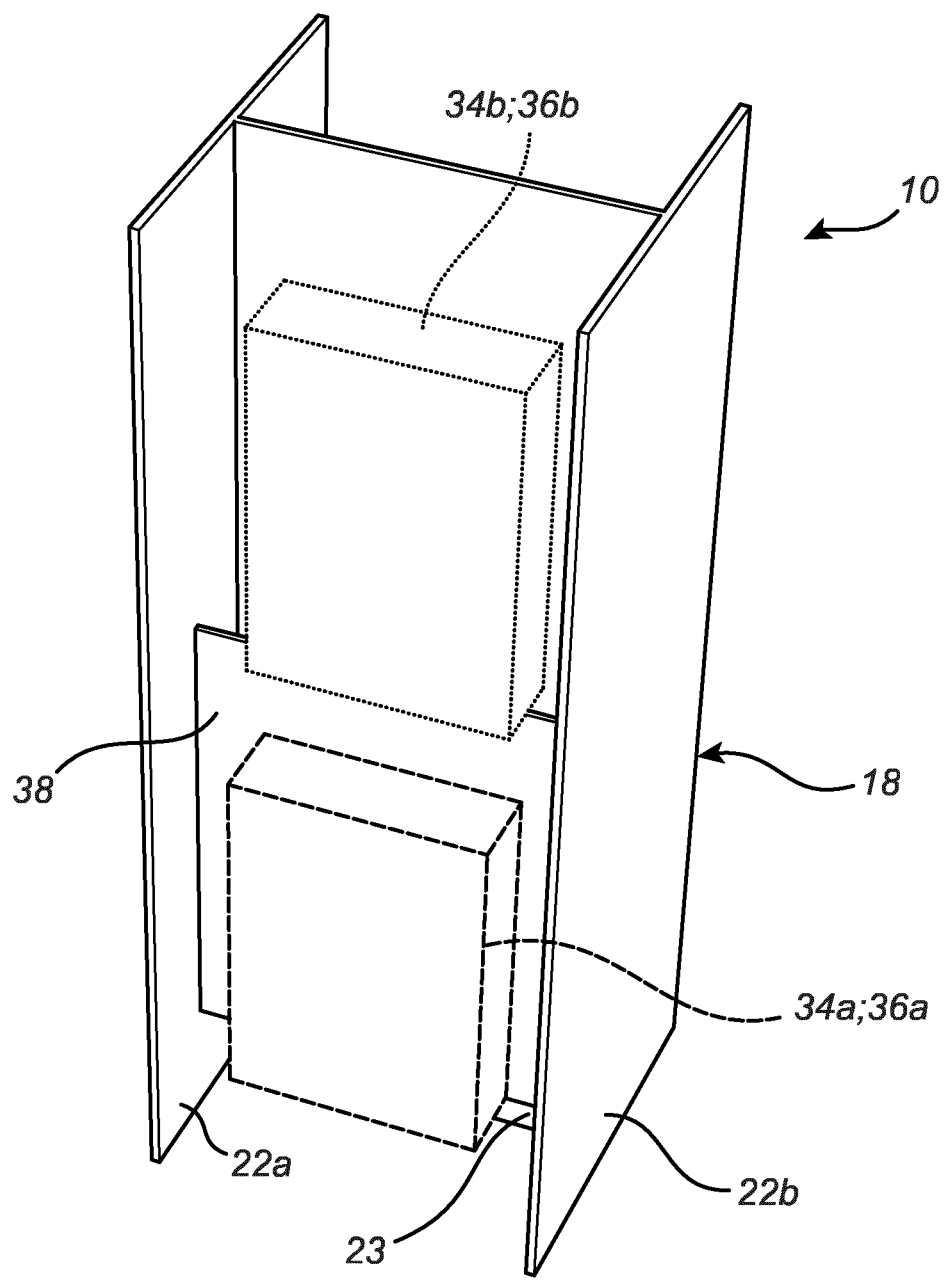
FIGS. 2a-c schematically show a street lighting pole base according to another embodiment of the present invention.
Figure 2B:
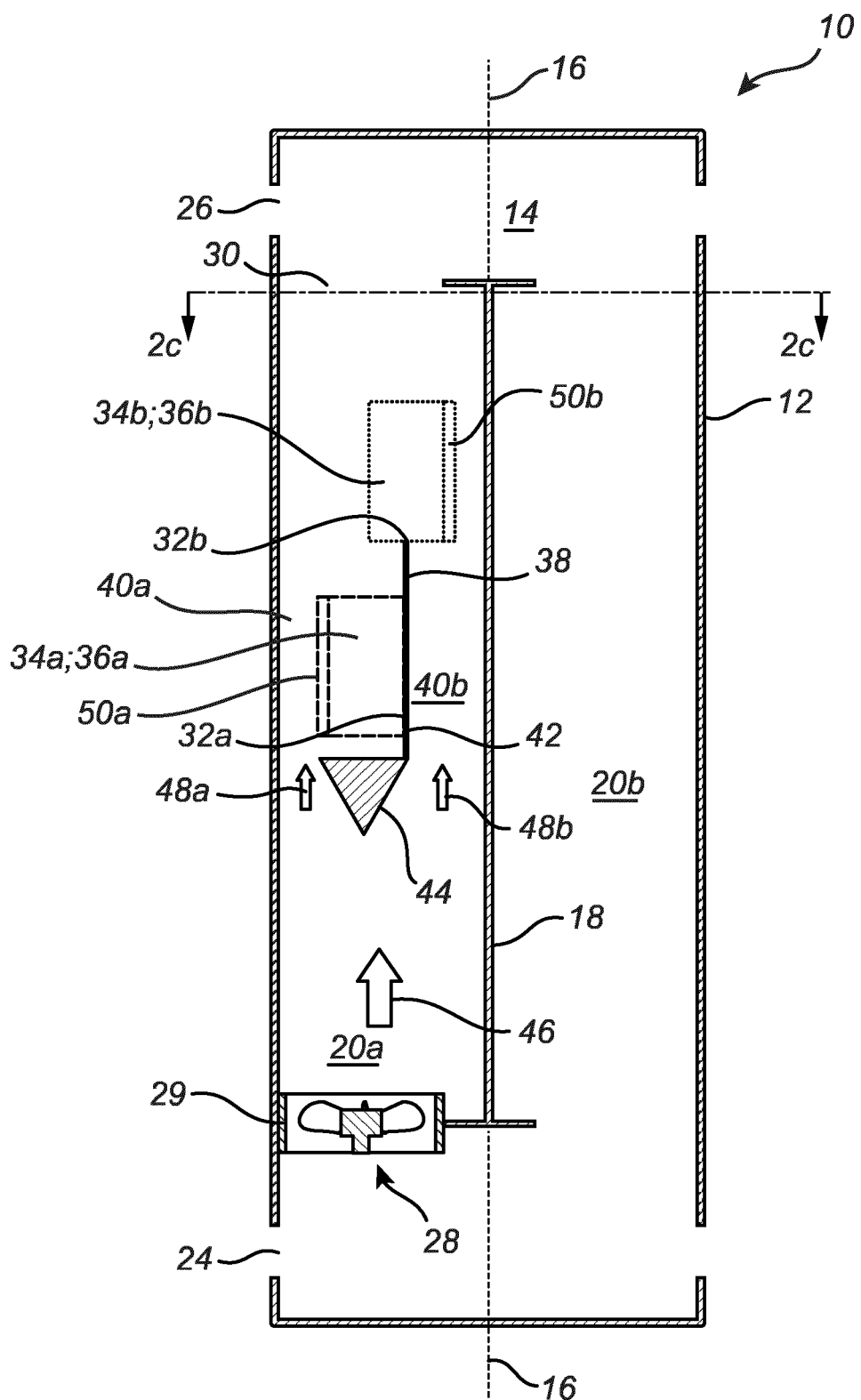
Figure 2C:
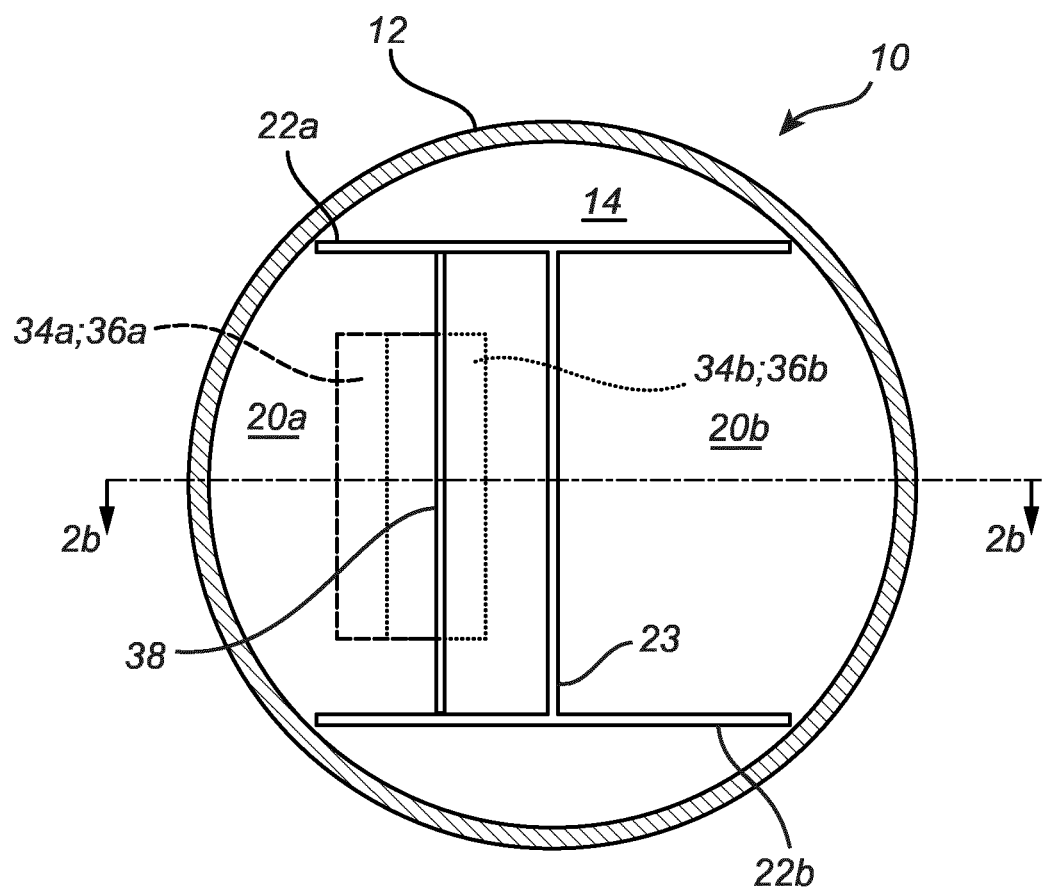

FIGS. 2a-c schematically show a street lighting pole base 10 according to another embodiment of the present invention. FIG. 2a is a perspective view, FIG. 2b is a cross-sectional side view, and FIG. 2c is a cross-sectional top view.

This embodiment is similar to the embodiment of FIGS. 1a-c, but instead of being arranged in the second sub-bay 40b, the second telecommunication radio 34b (when mounted in the second position 36b) is arranged on top of the vertical inner wall 42 of the sub-divider 38 and has its cooling means 50b placed above the second sub-bay 40b. The cooling means 50a of the first telecommunication radio 34a (when the first telecommunication radio 34a is mounted in the first position 36b) is facing the opposite direction. The cooling means 50a-b may for example be cooling fins provided on a side of the respective first and second telecommunication radios 34a-b. The second telecommunication radio 34b may here be mounted to the stems 22a-b of the divider 18 (if the second telecommunication radio 34b is sufficiently wide) and/or to the sub-divider 38. Furthermore, the first and second telecommunication radios 34a-b may here be mounted with some lateral overlap as seen in a direction perpendicular to the cross-bar 23 of the divider 18. It is appreciated that the second bay 20b may contain a corresponding configuration as the first bay 20a, or some other configuration as disclosed herein.

In operation (FIGS. 2a-c), air comes from the outside of the street lighting pole base 10 first through the common air inlet 24 and then through the individual air inlet 28 into the first bay 20a forming the (upwards) airflow 46. The air flow 46 is split by means of the sub-divider 38 into the first and second sub-airflows 48a-b. The first sub-airflow 48a flows upwards in the first sub-bay 40a on one side of the vertical inner wall 42 of the sub-divider 38 and cools the first telecommunication radio 34a in the first sub-bay 40a, whereafter it escapes the street lighting pole base 10 via the individual air outlet 30 and the common air outlet 26. The second sub-airflow 48b flows upwards in the second sub-bay 40b on the opposite side of the vertical inner wall 42 of the sub-divider 38 and is guided past the first telecommunication radio 34a by the aforementioned duct before cooling the cooling means 50b of the second telecommunication radio 34b above the second sub-bay 40b, whereafter it escapes the street lighting pole base 10 via the individual air outlet 30 and the common air outlet 26.

Figure 3A:
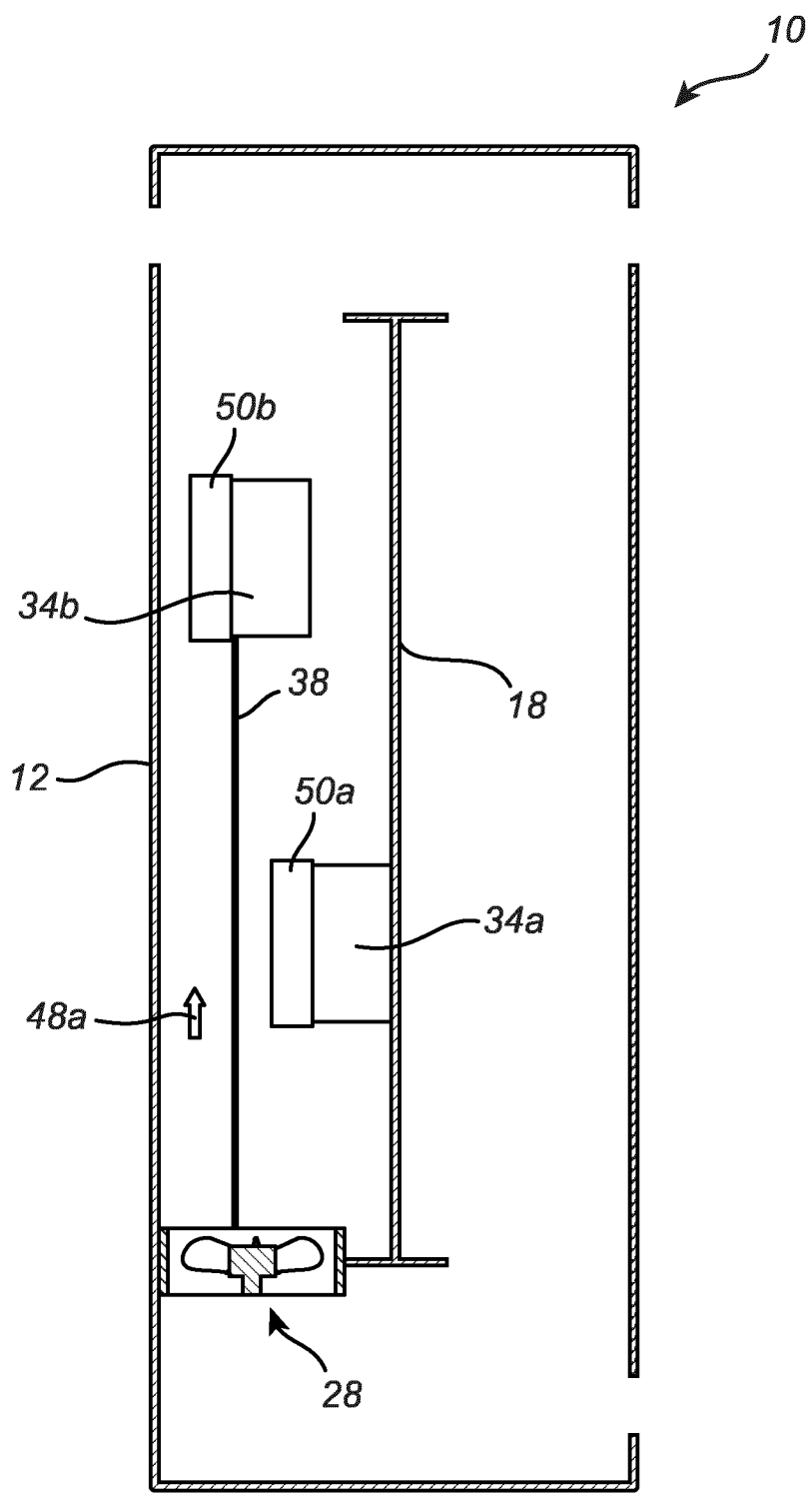
FIGS. 3a-c schematically show variants of the street lighting pole base of FIGS. 2a-c.

FIG. 3a shows a variant of the embodiment of FIGS. 2a-c, wherein the first and second telecommunication radios 34a-b are oriented in the same way. That is, the cooling means 50a-b are facing the same direction. Here, the first telecommunication radio 34a is or may be mounted to the divider 18, whereas the aforementioned duct adapted to guide the second sub-airflow 48b past (the first position 36a for) the first telecommunication radio 34a may be formed by the sub-divider 38 together with the cylindrical or tubular wall 12.

Figure 3B:
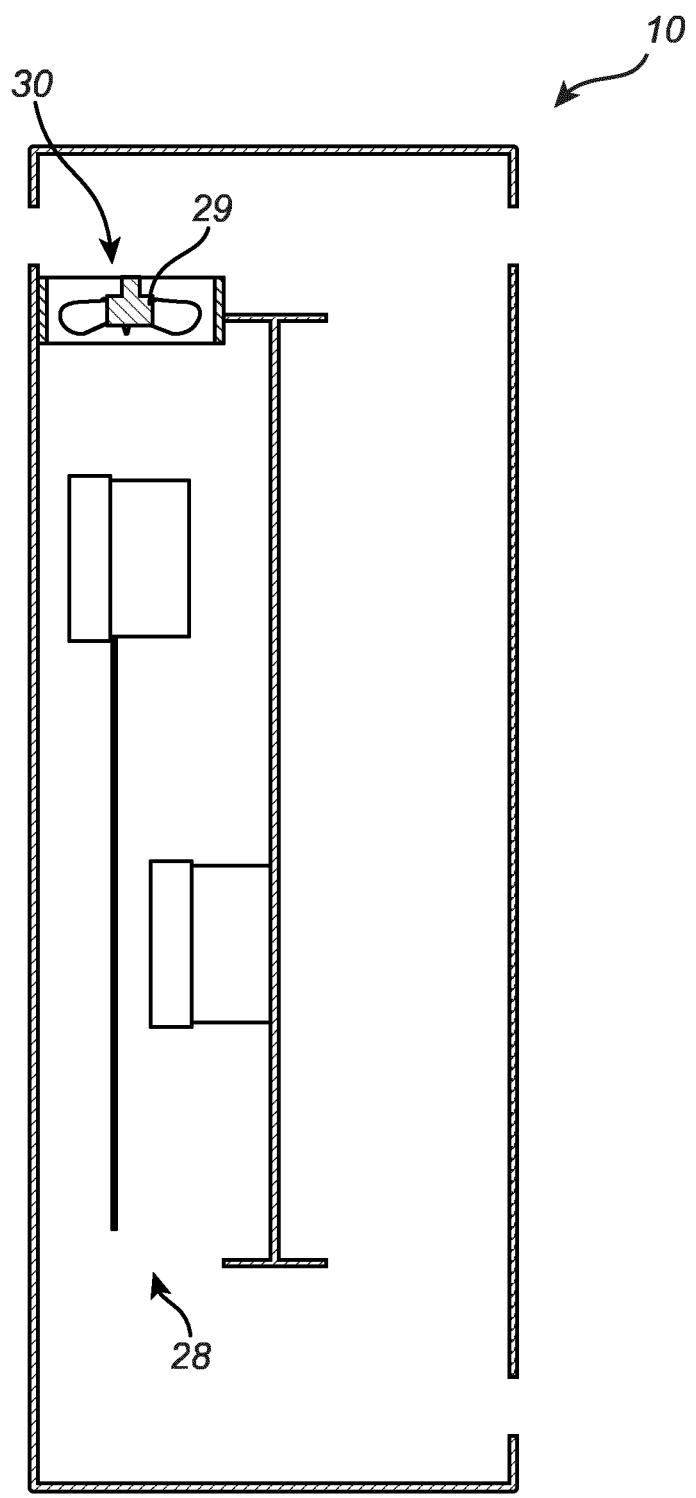

FIG. 3b shows another variant wherein the at least one fan 29 is arranged in the individual air outlet 30 rather than in the individual air inlet 28. This at least one fan 29 is adapted to such air from below. This arrangement is applicable also to other embodiments or variants, for example those shown in FIGS. 1a-c and 4a-c.

Figure 3C:
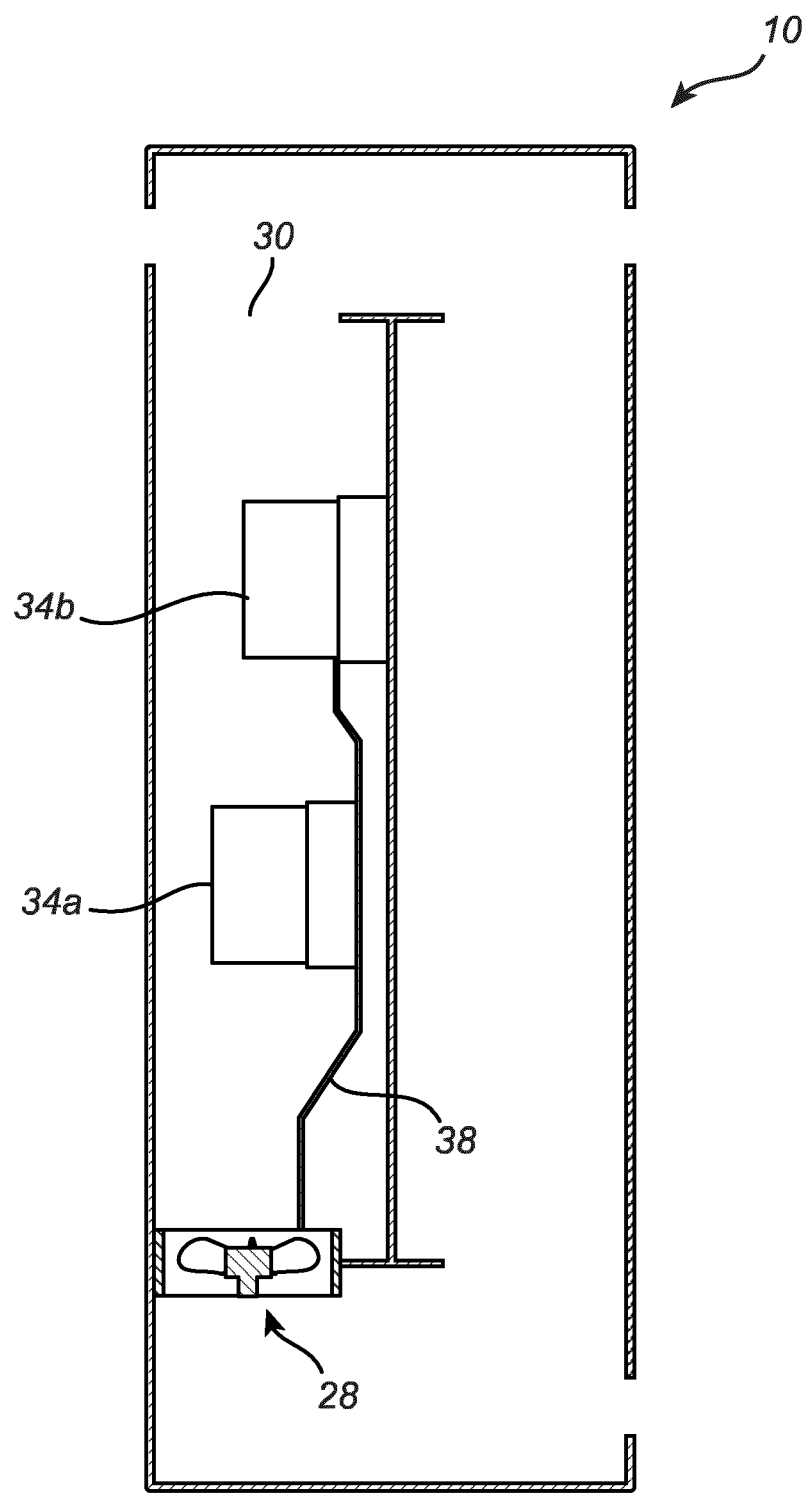

FIG. 3c shows yet another variant wherein the sub-divider 38 is bent, such that the aforementioned duct adapted to guide the second sub-airflow 48b past the first telecommunication radio 34a has a narrower cross-section in level with first telecommunication radio 34a and a wider cross-section towards the individual air inlet 28 and towards the individual air outlet 30, like half an hourglass shape as seen in the side view of FIG. 3c. This sub-divider 38 can for example be made of (bent) sheet metal. The first and second telecommunication radios 34a-b are here oriented in the same way, because of ease of mounting, but they could be oriented in opposite directions like in FIG. 2b.

Figure 4A:
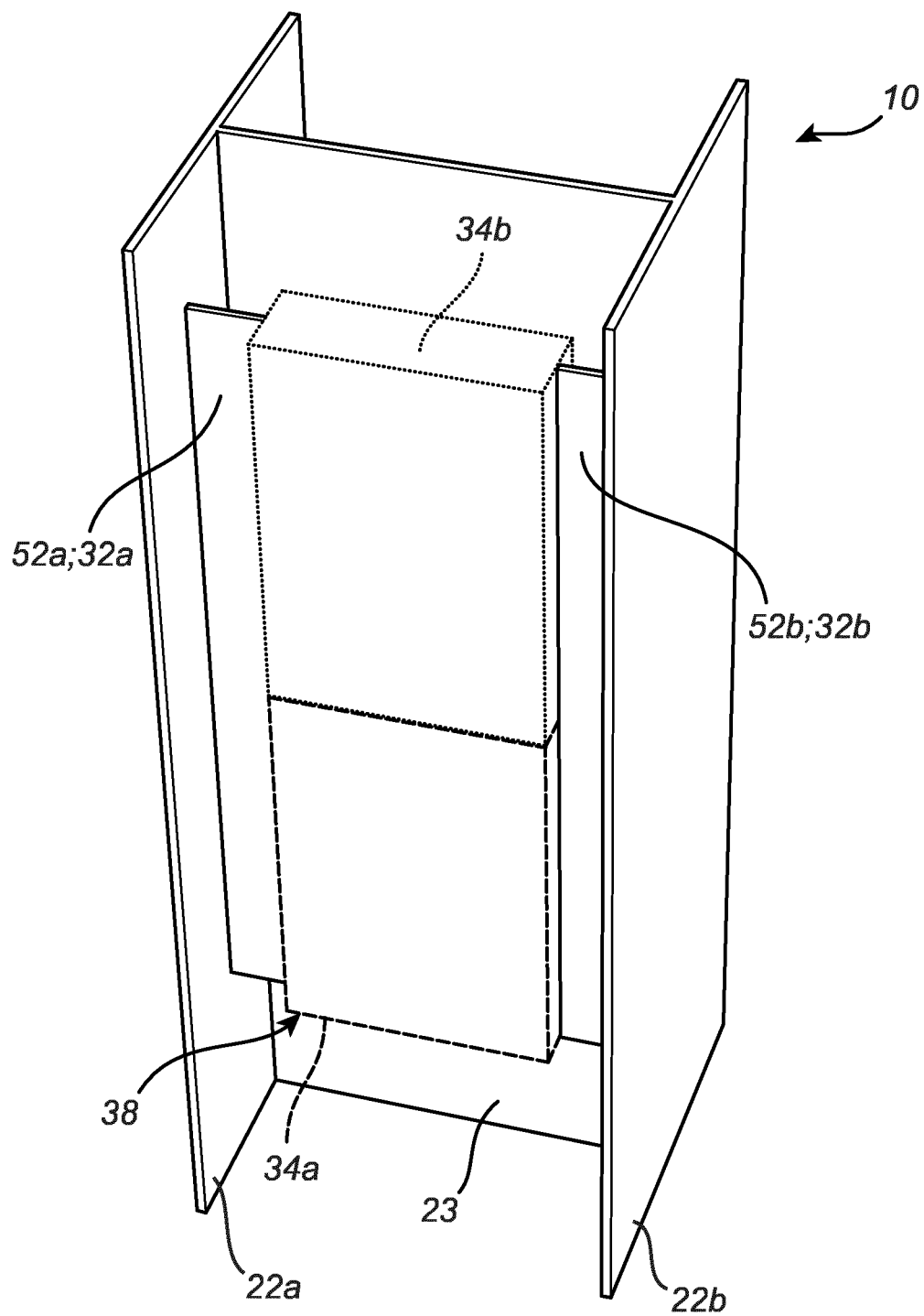
FIGS. 4a-c schematically show a street lighting pole base according to yet another embodiment of the present invention.
Figure 4B:
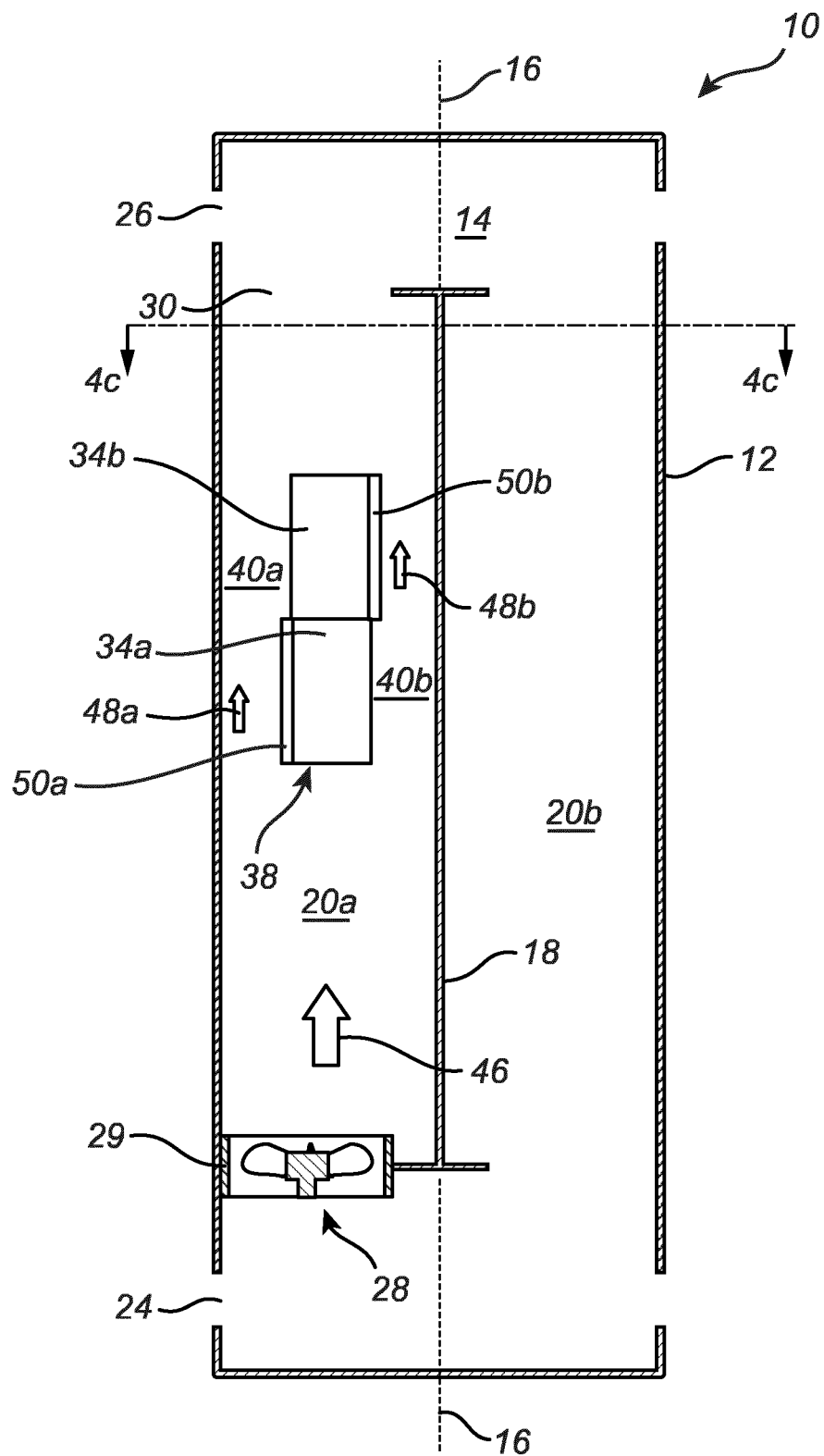
Figure 4C:
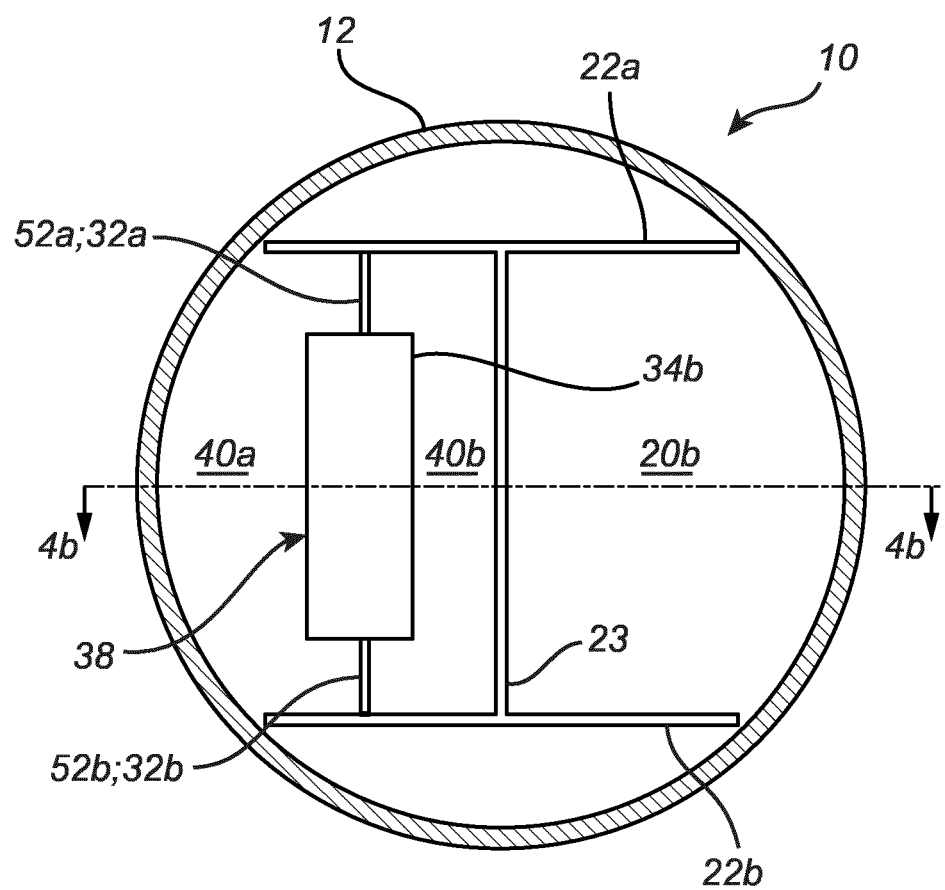

FIGS. 4a-c schematically show a street lighting pole base 10 according to yet another embodiment of the present invention. FIG. 4a is a perspective view, FIG. 4b is a cross-sectional side view, and FIG. 4c is a cross-sectional top view.

In this embodiment, the second telecommunication 34b radio is stacked on top of the first telecommunication radio 34a (with no lateral separation). Furthermore, the first telecommunication radio 34a has its cooling means 50a facing the first sub-bay 40a, and the second telecommunication radio 34b has its cooling means 50b facing the second sub-bay 40b. Furthermore, the first and second telecommunication radios 34a-b form part of the sub-divider 38. The sub-divider 38 may here further include side elements 52a-b arranged between the first and second telecommunication radios 34a-b and the respective stem 22a-b of the divider 18, as shown for example in FIG. 4c. The side elements 52a-b may also serve as the aforementioned first and second mounting means 32a-b. It is appreciated that the second bay 20b may contain a corresponding configuration as the first bay 20a, or some other configuration as disclosed herein.

In operation (FIGS. 4a-c), air comes from the outside of the street lighting pole base 10 first through the common air inlet 24 and then through the individual air inlet 28 into the first bay 20a forming the (upwards) airflow 46. The air flow 46 is split by means of the sub-divider 38 (i.e. the first telecommunication radio 34a and the side elements 52a-b) into the first and second sub-airflows 48a-b. The first sub-airflow 48a flows upwards in the first sub-bay 40a on one side of the sub-divider 38 and cools the cooling means 50a of the first telecommunication radio 34a, whereafter it escapes the street lighting pole base 10 via the individual air outlet 30 and the common air outlet 26. The second sub-airflow 48b flows upwards in the second sub-bay 40b on the opposite side of the sub-divider 38 and is guided past the "backside" of the first telecommunication radio 34a (i.e. the opposite side compared to the cooling means 50a) before cooling the cooling means 50b of the second telecommunication radio 34b, whereafter it escapes the street lighting pole base 10 via the individual air outlet 30 and the common air outlet 26.

Figure 5A:
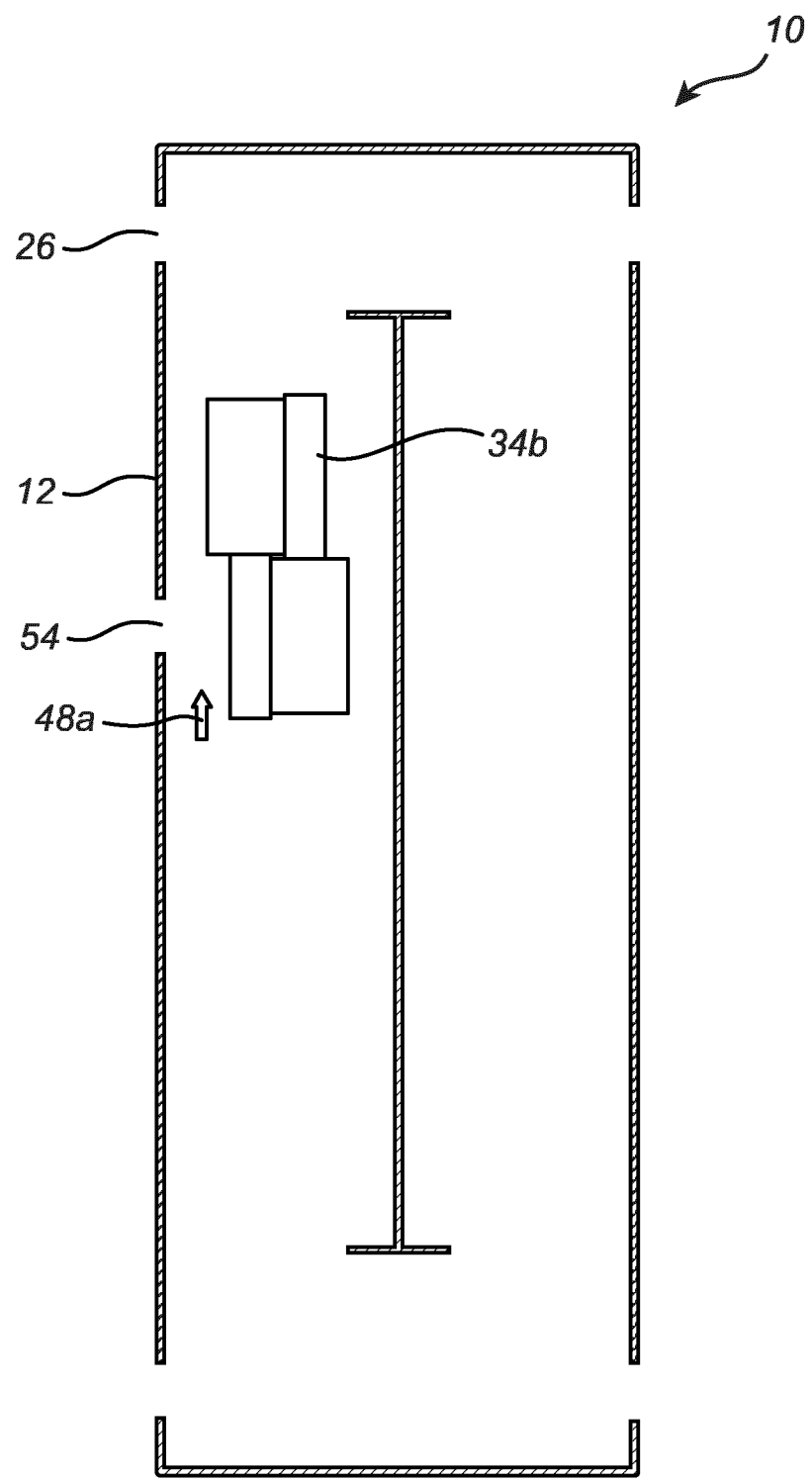
FIGS. 5a-b schematically show variants of the street lighting pole base of FIGS. 4a-c.

FIG. 5a shows a variant of the embodiment of FIGS. 4a-c, wherein the street lighting pole base 10 comprises an additional air outlet 54 exclusively for the first sub-airflow 48a. The additional air outlet 54 is in the cylindrical or tubular wall 12 below the second telecommunication radio 34b. The additional air outlet 54 is applicable also to other embodiments or variants, for example that shown in FIGS. 2a-c.

Figure 5B:
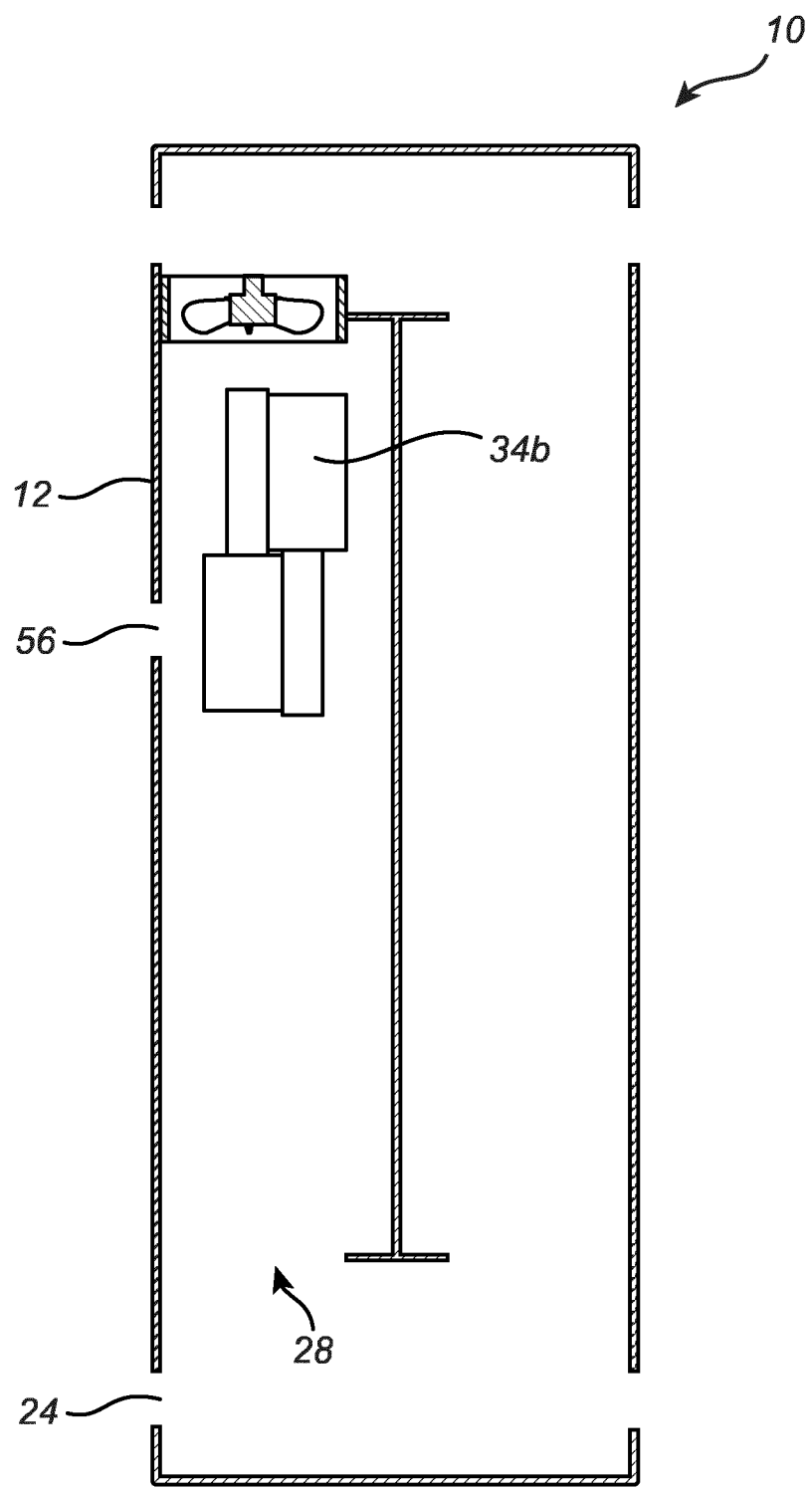

FIG. 5b shows a variant of the embodiment of FIGS. 4a-c, wherein the street lighting pole base 10 comprises an additional air inlet 56 provided in the cylindrical or tubular wall 12, above the individual air inlet 28 and any common air inlet 24. The additional air inlet 56 is adapted to provide additional (cooling) air from the outside of the street lighting pole base 10 exclusively to the second telecommunication radio 34b. The additional air inlet 56 is applicable also to other embodiments or variants, for example that shown in FIGS. 3a-b.

Figure 6:
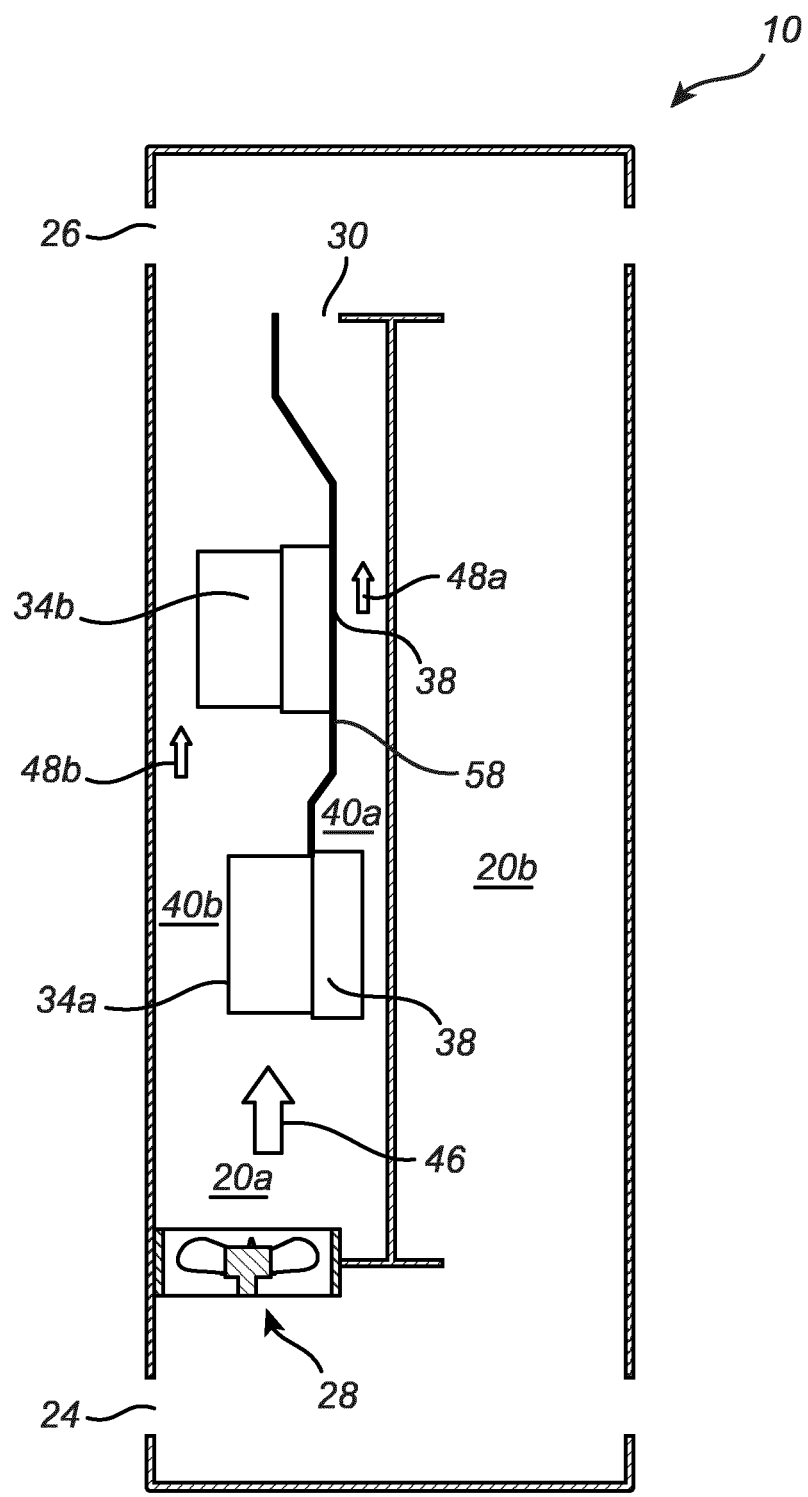
FIG. 6 is a schematic cross-sectional side view of a street lighting pole base according to a further embodiment of the present invention.

FIG. 6 schematically shows a street lighting pole base 10 according to a further embodiment of the present invention. In this embodiment, first the first telecommunication radio 34a is mounted in the first position 36a and forms a lower part of the sub-divider 38. The sub-divider 38 further comprises an upper part 58 adapted to guide the first sub-airflow 40a past the second telecommunication radio 36a. The upper part 58 may be bent, similar to the sub-divider 38 in FIG. 3c. It is appreciated that the second bay 20b may contain a corresponding configuration as the first bay 20a, or some other configuration as disclosed herein.

In operation (FIG. 6), air comes from the outside of the street lighting pole base 10 first through the common air inlet 24 and then through the individual air inlet 28 into the first bay 20a forming the (upwards) airflow 46. The air flow 46 is split by means of the sub-divider 38 including the first telecommunication radio 34a into the first and second sub-airflows 48a-b. The first sub-airflow 48a flows upwards in the first sub-bay 40a and cools the first telecommunication radio 34a, whereafter it escapes the street lighting pole base 10 via the individual air outlet 30 and the common air outlet 26. The upper part 58 of the sub-divider 38 helps capturing hot air from the first telecommunication radio 34a and guides it past the second telecommunication radio 34b. The second sub-airflow 48b flows upwards in the second sub-bay 40b past the "backside" of the first telecommunication radio 34a before cooling the second telecommunication radio 34b, whereafter it escapes the street lighting pole base 10 via the individual air outlet 30 and the common air outlet 26.

Figure 7:
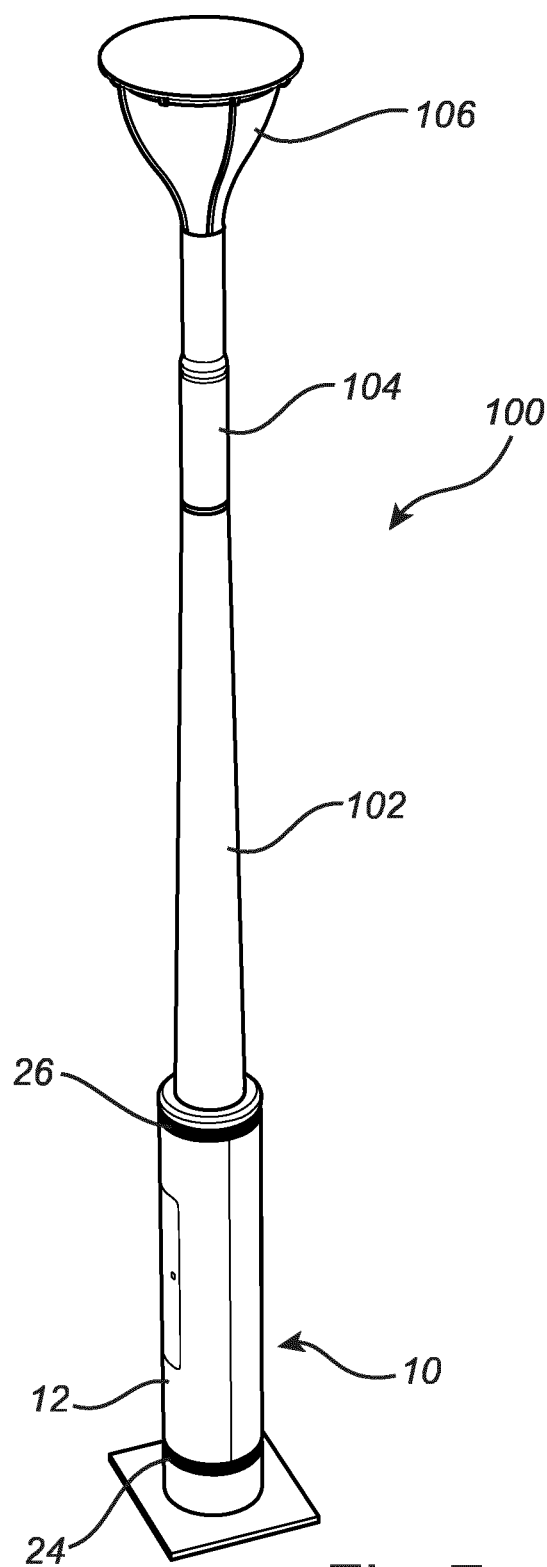
FIG. 7 is a side view of a street lighting pole according to an aspect of the present invention.

FIG. 7 is a side view of a street lighting pole 100 according to an aspect of the present invention. The street lighting pole 100 can be considered as a modular structure comprising a street lighting pole base 10, a mid-pole 102, an antenna 104, and a luminaire 106 adapted to emit light.

The street lighting pole base 10 may be of any embodiment or variant disclosed hereinabove. Except the first and second telecommunication radios 34a-b, ancillary equipment like circuit-breakers, power distribution, and fiber management may be located in the base.

The mid-pole 102 is mechanically connected to the street lighting pole base 10. The mid-pole 102 may be a steel transition piece that can be ordered at different lengths in order to achieve a range of pole heights.

The antenna 104 is electrically connected to the first and second telecommunication radios 34a-b by antenna cabling (not shown) running through the mid-pole 102. The antenna 104 may be provided in a tubular antenna section, which in turn can carry the mechanical load of the part mounted above it.

The part mounted above it may be the luminaire 106, or it could be a spigot or arm (not shown) to which one or more luminaires can be mounted.

The luminaire 106 is preferably an LED (light emitting diode) luminaire.

The person skilled in the art realizes that the present invention by no means is limited to the preferred embodiments described above. On the contrary, many modifications and variations are possible within the scope of the appended claims. For example, the street lighting pole base 10 could comprise at least one movable part (not shown) adapted to regulate at least one of the first and second sub-airflows 48a-b.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A street lighting pole base, comprising:
   at least one upright outer wall defining an enclosed space of the street lighting pole base;
   a divider dividing the enclosed space into at least two bays arranged side by side, the at least two bays including a first bay and a second bay;
   an individual air inlet for the first bay provided at the bottom of the divider;
   first mounting means for mounting a first heat dissipating device used for wireless telecommunication in a first position in the first bay;
   second mounting means for mounting a second heat dissipating device used for wireless telecommunication in a second position in the first bay, which second position is vertically higher than the first position; and
   a sub-divider arranged in the first bay and adapted to split an airflow from the individual air inlet for the first bay into a first sub-airflow into a first sub-bay and intended to mainly cool the first heat dissipating device used for wireless telecommunication when mounted in the first position in the first sub-bay but substantially not the second heat dissipating device used for wireless telecommunication when mounted in the second position and a second sub-airflow into a second sub-bay and intended to mainly cool the second heat dissipating device used for wireless telecommunication when mounted in the second position in the second sub-bay but substantially not the first heat dissipating device used for wireless telecommunication when mounted in the first position.

2. A street lighting pole base according to claim 1, wherein the first and second sub-bays are arranged side by side.

3. A street lighting pole base according to claim 2, wherein the first telecommunication radio when mounted in the first position is arranged in the first sub-bay, and wherein the second telecommunication radio when mounted in the second position is arranged in the second sub-bay.

4. A street lighting pole base according to claim 2, wherein the first heat dissipating device used for wireless telecommunication when mounted in the first position is arranged in the first sub-bay, and wherein the second heat dissipating device used for wireless telecommunication when mounted in the second position is arranged on top of the sub-divider and has its cooling means placed above the second sub-bay.

5. A street lighting pole base according to claim 2, wherein the first heat dissipating device used for wireless telecommunication is mounted in the first position and the second heat dissipating device used for wireless telecommunication is mounted in the second position, wherein the second heat dissipating device used for wireless telecommunication is arranged on top of the first heat dissipating device used for wireless telecommunication, wherein the first heat dissipating device used for wireless telecommunication has its cooling means facing the first sub-bay, wherein the second heat dissipating device used for wireless telecommunication has its cooling means facing the second sub-bay, and wherein the first and second heat dissipating device used for wireless telecommunication form part of said sub-divider.

6. A street lighting pole base according claim 2, wherein the second sub-bay comprises a duct formed at least partly by the sub-divider, which duct is adapted to guide the second sub-airflow past the first position for the first heat dissipating device used for wireless telecommunication to the second position for the second heat dissipating device used for wireless telecommunication.

7. A street lighting pole base according to claim 6, wherein the duct has a narrower cross-section in level with the first position for the first heat dissipating device used for wireless telecommunication and a wider cross-section towards at least one of the individual air inlet for the first bay and an individual air outlet for the first bay.

8. A street lighting pole base according to claim 1, wherein the sub-divider includes a substantially vertical inner wall, and wherein the first and second sub-airflows in operation flow on opposite sides of the substantially vertical inner wall.

9. A street lighting pole base according to claim 1, wherein the divider is H-shaped and formed by stems connected by a cross-bar.

10. A street lighting pole base according to claim 9, wherein the sub-divider extends between and connects the stems of the H-shaped divider.

11. A street lighting pole base according to claim 1, wherein the first heat dissipating device used for wireless telecommunication is mounted in the first position, wherein the first heat dissipating device used for wireless telecommunication forms a lower part of said sub-divider, and wherein said sub-divider further comprises an upper part adapted to guide the first sub-airflow past the second position for the second heat dissipating device used for wireless telecommunication.

12. A street lighting pole base according to claim 1, further comprising at least one movable part adapted to regulate at least one of the first and second sub-airflows.

13. A street lighting pole base according to claim 1, further comprising an additional air inlet provided in the at least one upright outer wall above the individual air inlet and adapted to provide additional air to the second position for the second heat dissipating device used for wireless telecommunication.

14. A street lighting pole, comprising:
   a street lighting pole base according to claim 1;
   a mid-pole mechanically connected to the street lighting pole base;
   an antenna electrically connectable or connected to the first and second heat dissipating devices used for wireless telecommunication; and
   a luminaire adapted to emit light.

15. A method of cooling first and second heat dissipating devices used for wireless telecommunication mounted in a street lighting pole base according to claim 1.

\* \* \* \* \*